(12) United States Patent
Bhat et al.

(10) Patent No.: US 9,701,229 B2
(45) Date of Patent: Jul. 11, 2017

(54) ARM REST STOP ASSEMBLY

(71) Applicant: Zodiac Seats US LLC, Gainesville, TX (US)

(72) Inventors: Vishwanath Bhat, Denton, TX (US); Ray Napier, Denton, TX (US); Robert Bernal, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 252 days.

(21) Appl. No.: 14/396,847

(22) PCT Filed: Apr. 24, 2013

(86) PCT No.: PCT/US2013/037917
§ 371 (c)(1),
(2) Date: Oct. 24, 2014

(87) PCT Pub. No.: WO2013/163260
PCT Pub. Date: Oct. 31, 2013

(65) Prior Publication Data
US 2015/0108815 A1     Apr. 23, 2015

Related U.S. Application Data

(60) Provisional application No. 61/637,376, filed on Apr. 24, 2012.

(51) Int. Cl.
*B60N 2/46*     (2006.01)
*B60N 2/42*     (2006.01)

(52) U.S. Cl.
CPC ............. *B60N 2/4606* (2013.01); *B60N 2/43* (2013.01); *B60N 2/4613* (2013.01)

(58) Field of Classification Search
USPC .................................................. 297/411.32
See application file for complete search history.

(56) References Cited

U.S. PATENT DOCUMENTS 4,097,088 A * 6/1978 Meiller .................. B60N 2/464
297/115
4,205,879 A * 6/1980 Heling ................. B60N 2/4606
297/411.29

(Continued)

FOREIGN PATENT DOCUMENTS

DE      19704469 A1    7/1998
DE      20101916 U1    6/2002
(Continued)

OTHER PUBLICATIONS

International Patent Application No. PCT/US2013/037917, International Preliminary Report on Patentability, mailed on Nov. 6, 2014, 9 pages.

(Continued)

*Primary Examiner* — David E Allred
(74) *Attorney, Agent, or Firm* — Kilpatrick Townsend & Stockton LLP; Dean W. Russell; Tiffany L. Williams

(57) ABSTRACT

Described are arm rest stop assemblies including an arm rest pivotally coupled to a fixed portion of a passenger seat and a down-stop mechanism comprising an adjustment pin inserted through the fixed portion of the passenger seat and an adjustment fastener coupled to the adjustment pin and the fixed portion of the passenger seat, wherein the location of the adjustment pin does not present a pinch point for passengers when the arm rest is lowered to the deployed position.

16 Claims, 7 Drawing Sheets

(56) References Cited

U.S. PATENT DOCUMENTS

| | | | | |
|---|---|---|---|---|
| 4,435,011 | A * | 3/1984 | Hakamata | B60N 2/4613 |
| | | | | 297/113 |
| 5,342,115 | A * | 8/1994 | De Filippo | B60N 2/4606 |
| | | | | 297/113 |
| 5,823,624 | A * | 10/1998 | Dahlbacka | B60N 2/464 |
| | | | | 297/411.32 |
| 8,132,861 | B2 * | 3/2012 | Cone | B60N 2/4633 |
| | | | | 297/411.32 |
| 8,931,847 | B2 * | 1/2015 | Cailleteau | B60N 2/0224 |
| | | | | 297/411.3 |
| 2004/0021349 | A1 * | 2/2004 | Longtin | B60N 2/4606 |
| | | | | 297/217.3 |
| 2011/0272991 | A1 * | 11/2011 | Saxton | B64D 11/06 |
| | | | | 297/411.46 |
| 2014/0062157 | A1 * | 3/2014 | Bruck | B60N 2/22 |
| | | | | 297/362.11 |
| 2016/0304011 | A1 * | 10/2016 | Ellis | B64D 11/06 |

FOREIGN PATENT DOCUMENTS

| | | | | |
|---|---|---|---|---|
| EP | 1080985 | A2 | 3/2001 | |
| GB | 2170099 | A * | 7/1986 | B60N 2/4626 |

OTHER PUBLICATIONS

PCT/US2013/037917, Search Report and Written Opinion dated Jul. 22, 2013, 11 pages.

\* cited by examiner

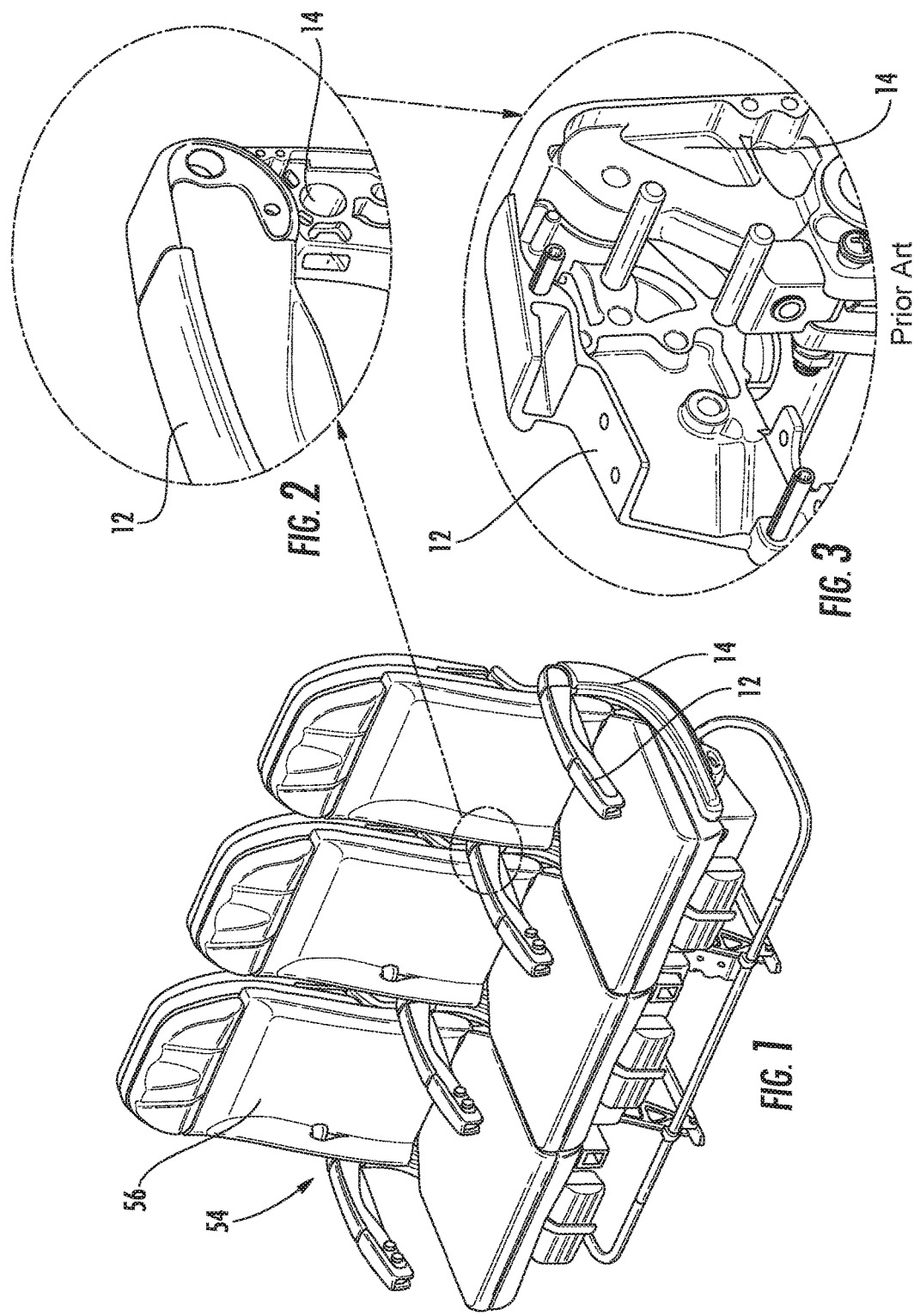

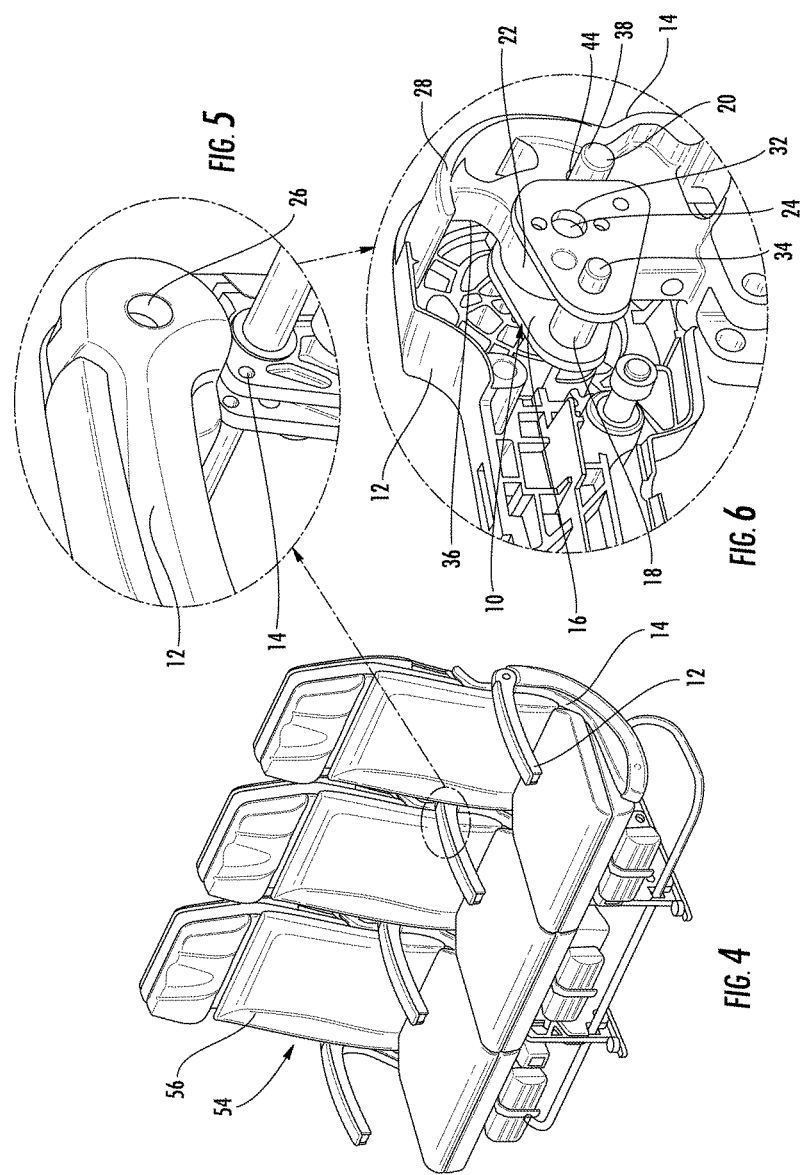

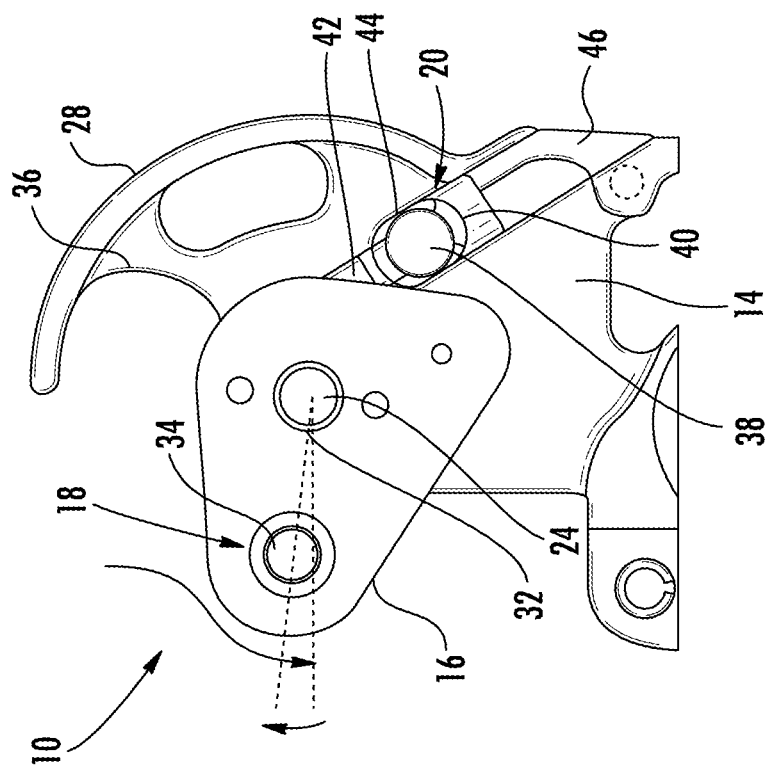
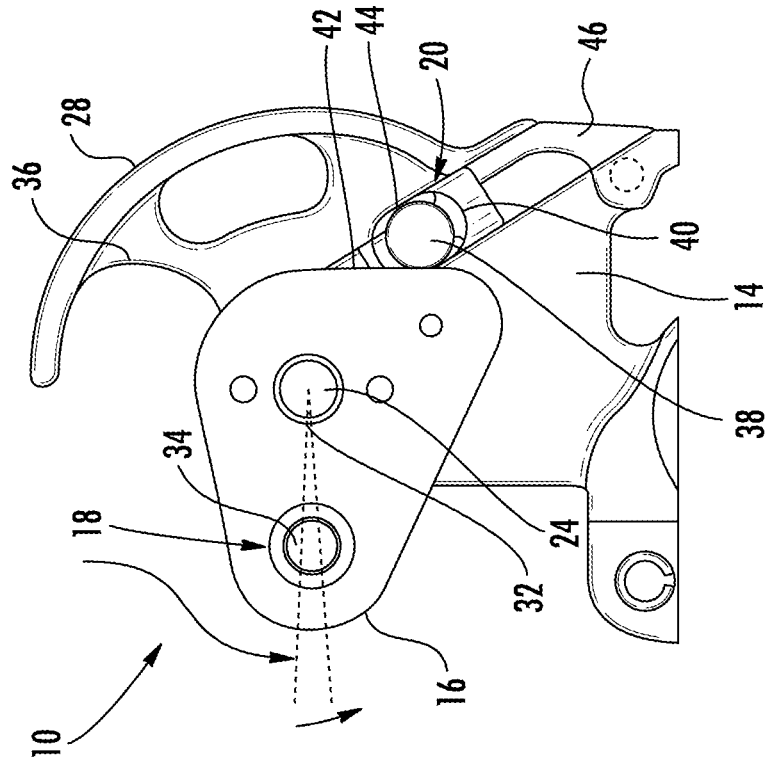

ARM REST STOP ASSEMBLY

CROSS REFERENCE TO RELATED APPLICATIONS

This application is the U.S. national phase entry of International Patent Application Serial No. PCT/US2013/037917, filed on Apr. 24, 2013, entitled ARM REST STOP ASSEMBLY ("the '917 application") which is related to and claims priority benefits from U.S. Provisional Application Ser. No. 61/637,376, filed on Apr. 24, 2012, entitled INTERNAL DOWN STOP MECHANISM FOR ARMREST ("the '376 application"). The '917 and '376 applications are hereby incorporated herein in their entireties by this reference.

FIELD OF THE INVENTION

The invention relates to arm rest stop mechanisms for passenger seats or the like.

BACKGROUND

Common carriers, such as passenger airlines, bus lines, train lines, and passenger vehicles frequently include passenger seats. To increase a passenger's comfort and enjoyment, many passenger seats include movable arm rests, which may be raised to a stowed position to increase the amount of room available for a passenger, and may also be lowered to a deployed position to provide a location for a passenger to rest his or her arms, access certain amenities, or have a support for other objects, such as personal electronic devices, books, or other objects.

Conventionally, as illustrated in FIGS. 1-3, the raised and deployed positions of these arm rests have been controlled by up-stop mechanisms and down-stop mechanisms that contact the arm rest at the appropriate location along the rotational path of the arm rest to prevent further rotation in that direction. In most cases, the down-stop mechanism is located in a location that presents a pinching hazard when the arm rest is lowered to the deployed position. Thus, it may be desirable to provide a down-stop mechanism that does not pose a pinch hazard.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include an arm rest stop assembly comprising an arm rest pivotally coupled to a fixed portion of a passenger seat and a down-stop mechanism comprising an adjustment pin inserted through the fixed portion of the passenger seat. In certain embodiments, the fixed portion of the passenger seat is a spreader. The arm rest stop assembly may further comprise a pivot plate fixedly coupled to the arm rest and pivotally coupled to the fixed portion of the passenger seat. The arm rest stop assembly may also further comprise an up-stop mechanism comprising a stop pin coupled to the pivot plate, wherein the location of the stop pin is configured to contact a surface of the fixed portion of the passenger seat when the arm rest reaches a raised position.

According to some embodiments, the adjustment pin is inserted through the fixed portion in a location that is covered by the arm rest. In other embodiments, the adjustment pin is inserted through the fixed portion in a location where the adjustment pin contacts the pivot plate when the arm rest reaches a deployed position and does not present a pinch point for passengers when the arm rest is lowered to the deployed position.

The adjustment pin may also be configured to halt rotation of the arm rest from a raised position to a deployed position. In some embodiments, the adjustment pin may comprise a rounded contact surface to prevent application of a twisting force about an axis of the adjustment pin when the arm rest rotation is halted by the adjustment pin.

In some embodiments, the down-stop mechanism further comprises an adjustment fastener coupled to the adjustment pin and the fixed portion of the passenger seat. The adjustment fastener may be configured so that application of a torque force to the adjustment fastener induces linear travel of the adjustment pin relative to the fixed portion of the passenger seat.

In certain embodiments, the adjustment pin may be inserted through an aperture in the fixed portion of the passenger seat, and the adjustment fastener may be inserted through a slot in the fixed portion of the passenger seat. The slot may be oriented at more than 45 degrees relative to a horizontal plane, and the slot may intersect the aperture.

According to certain embodiments, a securing device is positioned within the slot to prevent loosening of the adjustment fastener.

BRIEF DESCRIPTION OF THE DRAWINGS

FIG. 1 is a front perspective view of a row of passenger seats with conventional arm rest stop.

FIG. 2 is a partial view of the connection between an arm rest and a spreader of the passenger seat of FIG. 1.

FIG. 3 is an internal view of the conventional arm rest stop of FIG. 1.

FIG. 4 is a front perspective view of a row of passenger seats with arm rest stop assemblies according to certain embodiments of the present invention.

FIG. 5 is a partial view of the connection between an arm rest and a spreader of the passenger seat of FIG. 4.

FIG. 6 is an internal view of the arm rest stop assembly of FIG. 4.

FIG. 9 is a side view of the arm rest stop assembly of FIG. 4 showing an adjustment to the position of the adjustment pin to lower a deployed position of the arm rest.

FIG. 10 is a side view of the arm rest stop assembly of FIG. 4 showing an adjustment to the position of the adjustment pin to raise a deployed position of the arm rest.

DETAILED DESCRIPTION

Figures 7, 8:
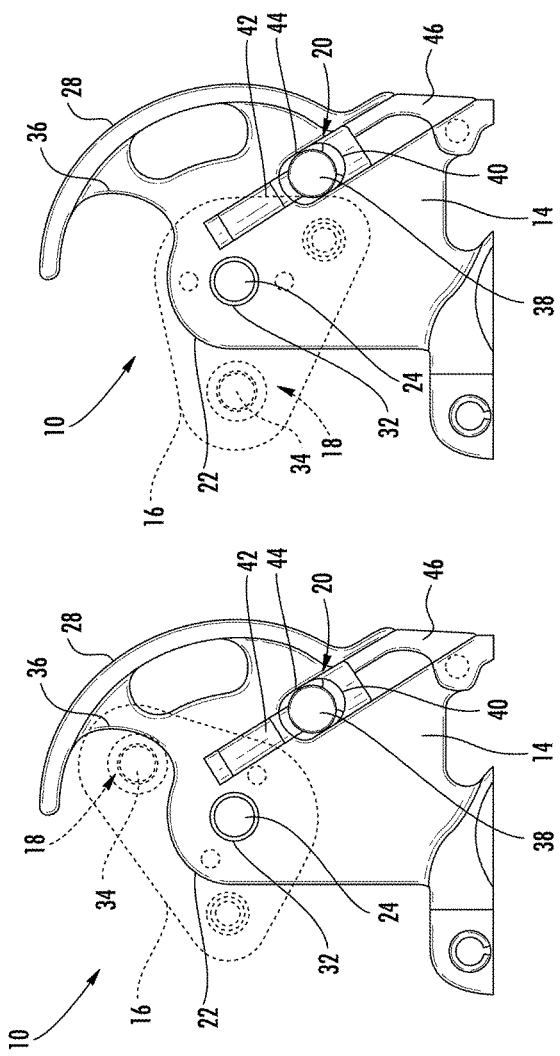
FIG. 7 is a side view of the arm rest stop assembly of FIG. 4 showing the position of the arm rest stop assembly when the arm rest is in a raised position.
FIG. 8 is a side view of the arm rest stop assembly of FIG. 4 showing the position of the arm rest stop assembly when the arm rest is in a deployed position.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide arm rest stop assemblies for use with an arm rest of a passenger seat. While the arm rest stop assemblies are discussed for use with arm rests attached to passenger seats, they are by no means so limited. Rather, the arm rest stop assemblies may be used for other radially moving apparatuses in passenger seats or other seats of any type or otherwise as desired.

FIGS. 4-12 illustrate embodiments of an arm rest stop assembly 10. In these embodiments, the arm rest stop assembly 10 comprises an arm rest 12, a spreader 14, one or more pivot plates 16, an up-stop mechanism 18, and a down-stop mechanism 20.

In some embodiments, as shown in FIGS. 4-6, the spreader 14 forms part of a fixed portion of a passenger seat 54. The spreader 14 may include a coupling projection 22 located in an aft region of the spreader 14 proximate a location of a passenger seat back 56 in an upright position. The coupling projection 22 may include an aperture 24. Likewise, the arm rest 12 may include one or more apertures 26 in an aft region of the arm rest 12. The arm rest 12 may be pivotally coupled to the coupling projection 22 via a mechanical fastener inserted through the apertures 24, 26. The arm rest 12 then pivots relative to the spreader 14 between a raised position (indicated by the position of the pivot plate 16 in FIG. 7) and a deployed position (indicated by the position of the pivot plate 16 in FIG. 8). A spreader 14 may further comprise a shield 28 that is configured to surround an aft area and at least a portion of a top area of the coupling projection 22 so as to prevent access to the coupling location between the spreader 14 and the arm rest 12 from an and upper aft direction.

In certain embodiments, the amount of rotation of the arm rest 12 relative to the spreader 14 may be controlled via an up-stop mechanism 18 and a down-stop mechanism 20, portions of which may be coupled to the pivot plate 16. The pivot plate 16 may be formed of materials including but not limited to steel, other metallic materials, other composite materials, or other similar high strength materials designed to withstand higher loads.

In these embodiments, as shown in FIGS. 6-11, the pivot plate 16 may include an aperture 32 through which the mechanical fastener joining the arm rest 12 to the spreader 14 may also be inserted, thereby also pivotally coupling the pivot plate 16 to the coupling projection 22. The pivot plate 16 may also be fixedly coupled to or integrally formed with an inner surface of the arm rest 12 so that the pivot plate 16 is rotated by the rotation of the arm rest 12. In some embodiments, as shown in FIG. 6, two pivot plates 16 are located on each side of the coupling projection 22. However, one of ordinary skill in the relevant art will understand that any suitable number and arrangement of pivot plates 16 may be used in conjunction with the up-stop mechanism 18 and the down-stop mechanism 20.

The up-stop mechanism 18 may further include a stop pin 34 that is configured to contact a stop surface 36 when the arm rest 12 reaches the raised position (as shown in FIG. 7) to prevent further rotation of the arm rest 12 in the raised direction. The stop surface 36 may be an inner surface of the shield 28 or other suitable surface of the spreader 14. In these embodiments, the stop pin 34 may be coupled to one or more pivot plates 16 in any suitable location that allows the stop pin 34 to contact the stop surface 36 when the arm rest 12 reaches the desired raised position.

In some embodiments, as illustrated in FIGS. 6-11, the pivot plate 16 may have a generally triangular shape with the aperture 24 generally located proximate an upper vertex of the triangular shape when the arm rest 12 is in a deployed position. The stop pin 34 may be positioned proximate a forward vertex of the triangular shape when the arm rest 12 is in a deployed position. The rotational path of the stop pin 34 may be adjusted based on the length of the side between the upper vertex and the forward vertex of the pivot plate 16 (as positioned when the arm rest 12 is in a deployed position). One of ordinary skill in the relevant art will understand that the pivot plate 16 may have any suitable shape including but not limited to clover-leaf, clubbed, round, rectilinear, elliptical, pentagonal, hexagonal, or any other polygonal shape as needed to allow the stop pin 34 to travel about the coupling projection 22 and contact the stop surface 36 in the appropriate location.

The down-stop mechanism 20 may comprise an adjustment pin 38, an adjustment fastener 40, and a securing device 42. In some embodiments, as shown in FIGS. 6-11, the adjustment pin 38 is inserted through another aperture 44 in the spreader 14. In these embodiments, the aperture 44 passes through the spreader 14 in a location that will allow the adjustment pin 38 to contact the pivot plate 16 when the arm rest 12 reaches the desired deployed position (as shown in FIGS. 6, 8-11) to prevent further rotation of the arm rest 12 in the deployed direction. The aperture 44 is positioned on the spreader 14 in a location that is covered by the arm rest 12 so that passengers are not able to access the contact point between the pivot plate 16 and the adjustment pin 38, thus eliminating a potential pinch point that would result when the arm rest 12 is lowered to a deployed position if the aperture 44 was positioned in an accessible location.

The recessed location of the aperture 44 between the coupling projection 22 and the shield 28 also provides enough clearance for cable connected to controllers within the arm rest 12 to pass through, also eliminating cable pinch issues. In other embodiments, the arm rest 12 may be configured to surround the down-stop mechanism 20 without the need for the shield 28.

In some embodiments, the adjustment pin 38 may include a rounded contact surface that is used to avoid any twisting force about the axis of the adjustment pin 38. However, the adjustment pin 38 may have any suitable cross-sectional shape including but not limited to hexagonal, elliptical, parabolic, rectilinear, clubbed, triangular, or other suitable shape that provides an appropriate surface shape to mate with the pivot plate 16. A person of ordinary skill in the relevant art will understand that the remainder of the shape of the adjustment pin 38 may vary as needed based on the stress loads. The adjustment pin 38 may be formed of materials including but not limited to steel, other metallic materials, other composite materials, or other similar high strength materials designed to withstand higher loads. The adjustment pin 38 is designed with a tighter tolerance to prevent rattling.

The adjustment pin 38 may be coupled to the spreader 14 via the adjustment fastener 40. The adjustment fastener 40 may be formed of materials including but not limited to steel, other metallic materials, other composite materials, or other similar high strength materials designed to withstand higher loads. The adjustment fastener 40 may also include lock-tight to prevent it from loosening due to vibration.

In these embodiments, a slot 46 is formed through the spreader 14 in a direction that intersects the aperture 44. The adjustment pin 38 may include an opening along its shaft that is configured to couple to the adjustment fastener 40. Thus, to couple the adjustment pin 38 to the adjustment fastener 40, the adjustment pin 38 is inserted through the aperture in the adjustment pin 38 and positioned so that the opening is aligned with the slot 46. The adjustment fastener 40 is then inserted through the slot 46 and coupled to the opening in the adjustment pin 38. The aperture 44 may have an oblong shape that allows the location of the adjustment pin 38 to travel along the length of the aperture 44 as the adjustment fastener 40 is inserted further within or withdrawn from the slot 46.

In certain embodiments, as shown in FIGS. 9-10, the direction of the slot 46 and the shape of the aperture 44 controls the direction that the adjustment pin 38 travels. For example, if the slot 46 and the oblong shape of the aperture 44 were oriented horizontally, the adjustment pin 38 would travel in a horizontal direction. In the embodiments illustrated in FIGS. 9-10, the slot 46 and the oblong shape of the aperture 44 are oriented more than 45 degrees relative to a horizontal plane. Thus, the adjustment pin 38 also travels in a direction that is more than 45 degrees relative to a horizontal plane. One of ordinary skill in the relevant art will understand that any suitable angle of the slot 46 may be used that allows the spreader 14 to absorb the majority of the load transferred by the movement of the arm rest 12, instead of having the majority of the load absorbed directly by the adjustment fastener 40. The slot 46 may also be configured with a tighter tolerance to avoid rattling and minimize bending forces exerted on the adjustment fastener 40. The slot 46 may also be configured to provide a sliding fit with the adjustment pin 38 and the adjustment fastener 40.

Figure 11:
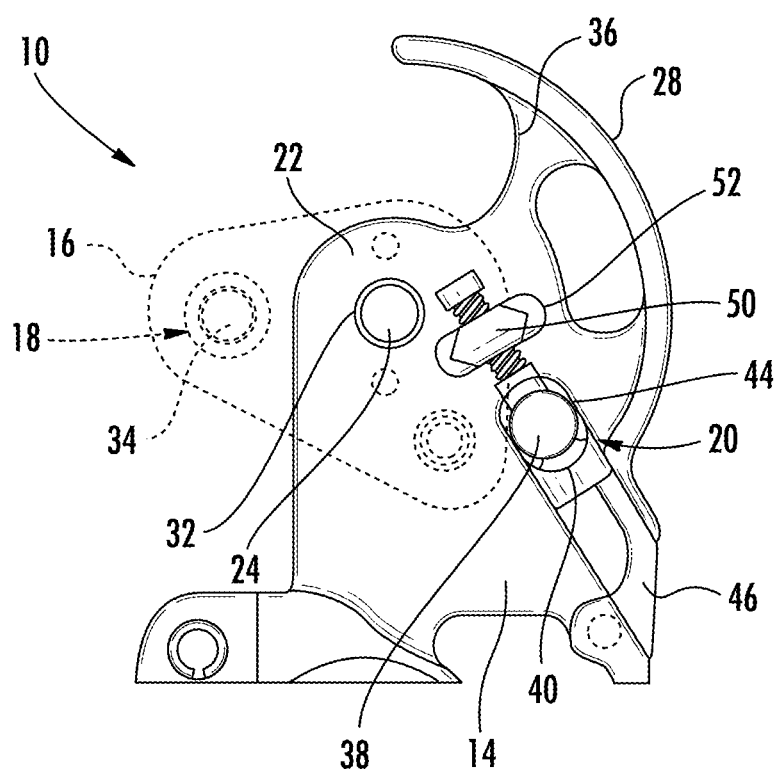
FIG. 11 is a side view of the arm rest stop assembly of FIG. 4 showing the use of a nut as a securing device.

To secure the position of the adjustment fastener 40, and thus, the position of the adjustment pin 38 along the oblong length of the aperture 44, the securing device 42 may be located at an end of the slot 46 opposite the insertion end of the slot 46. In these embodiments, after the adjustment fastener 40 passes through the opening in the adjustment pin 38, the end of the adjustment fastener 40 is then coupled to the securing device 42. The securing device 42 may be a helical insert or heli-coil or other device configured to prevent the adjustment fastener 40 from loosening due to vibration so as to maintain the adjustment pin 38 in a fixed location on the spreader 14. In other embodiments, as shown in FIG. 11, a nut 50 may be positioned within a nut slot 52 aligned with the end of the slot 46 opposite the insertion end of the slot 46. The nut 50 may provide higher strength to the adjustment fastener 40 under certain conditions. One of ordinary skill in the relevant art will understand that any suitable securing device 42 or design may be used to secure the adjustment fastener 40 to the spreader 14.

In the event that the arm rest 12 deployed position needs to be adjusted, the adjustment fastener 40 may be inserted farther into the slot 46, thus pushing the adjustment pin 38 forward and/or upward so as to shorten the rotational path of the pivot plate 16 before it contacts the adjustment pin 38, or the adjustment fastener 40 may be retracted slightly from the slot 46 so as to extend the rotational path of the pivot plate 16 before it contacts the adjustment pin 38. In other words, the deployed position of the arm rest 12 is achieved by applying a torque force to the adjustment fastener 40 in a clockwise or counter-clockwise direction to induce linear travel of the adjustment pin 38 along the oblong direction of the aperture 44.

Figure 12:
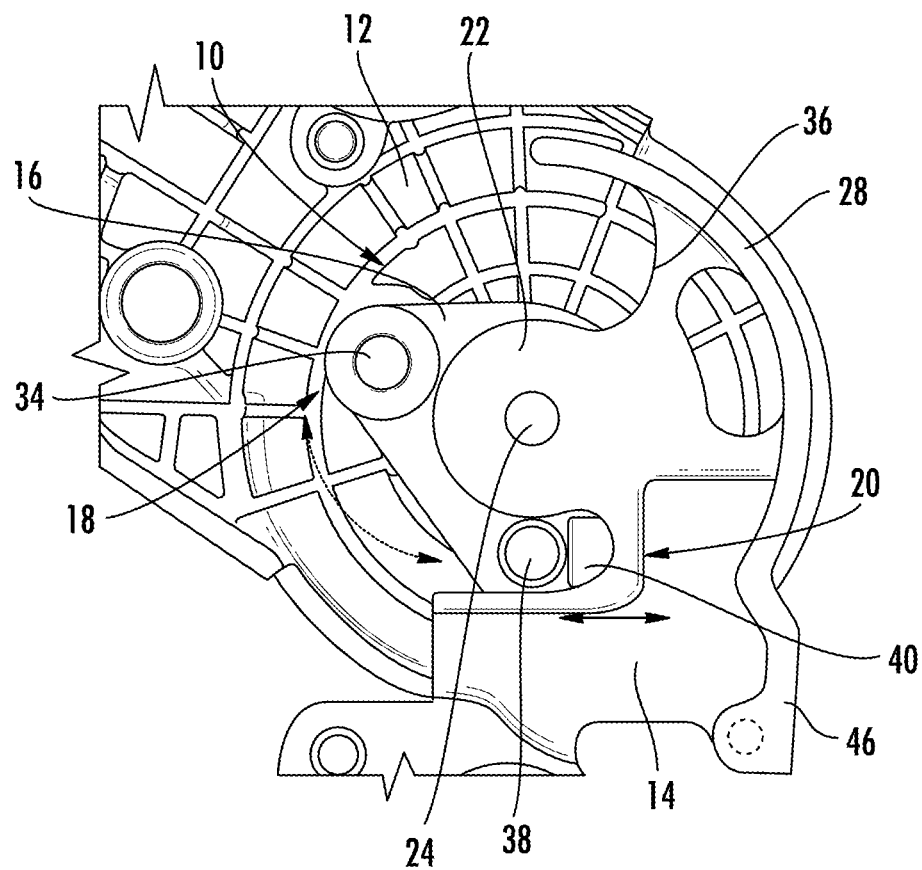
FIG. 12 is a side view of an arm rest stop assembly according to certain embodiments of the present invention.

In other embodiments, as shown in FIG. 12, the adjustment pin 38 may be positioned on the pivot plate 16 instead of within the aperture 44 on the spreader 14. In these embodiments, the adjustment pin 38 may be positioned proximate an aft vertex of the triangular shape of the pivot plate 16 (as positioned when the arm rest 12 is in a deployed position). The slot 46 is then aligned so that the head of the adjustment fastener 40 contacts that adjustment pin 38 when the arm rest 12 reaches the desired deployed position (as shown in FIG. 12) to prevent further rotation of the arm rest 12 in the deployed direction. In the event that the arm rest 12 deployed position needs to be adjusted, the adjustment fastener 40 may be inserted farther into the slot 46 so as to extend the rotational path of the adjustment pin 38 before it contacts the adjustment fastener 40, or the adjustment fastener 40 may be retracted slightly from the slot 46 so as to shorten the rotational path of the adjustment pin 38 before it contacts the adjustment fastener 40. In other words, the deployed position of the arm rest 12 is achieved by torqueing the adjustment fastener 40 clockwise or counter-clockwise to adjust the location where the adjustment pin 38 contacts the adjustment fastener 40.

Figure 13:
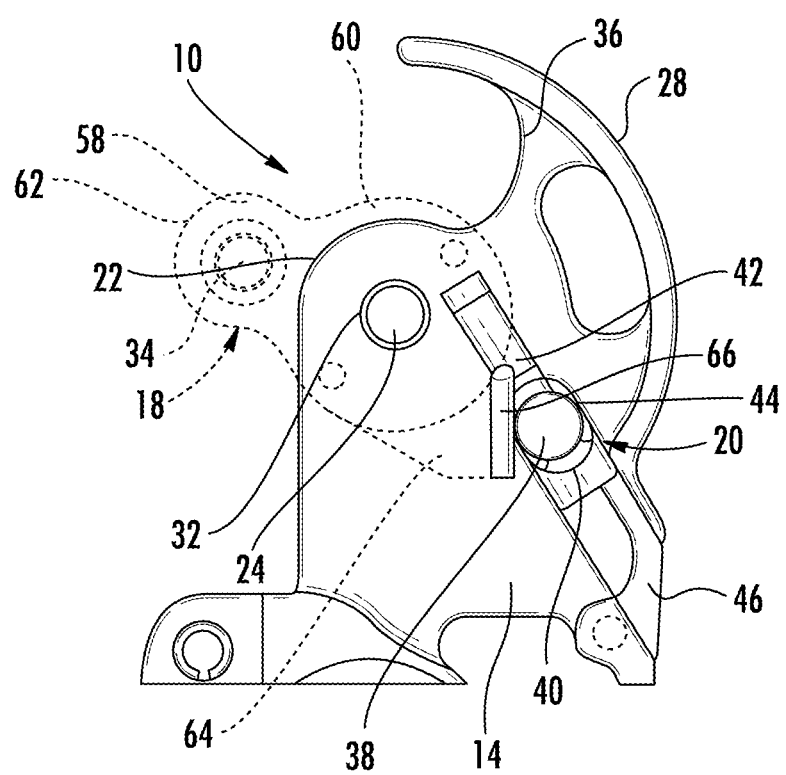
FIG. 13 is a side view of an arm rest stop assembly according to certain embodiments of the present invention.

According to some embodiments, such as the embodiments illustrated in FIG. 13, an arm pivot 58 may be used in place of the pivot plate 16. The arm pivot 58 may be formed of materials including but not limited to aluminum, steel, other metallic materials, other composite materials, or other materials with similar strengths.

In these embodiments, the arm pivot 58 may be fixedly coupled to or integrally formed with an inner surface of the arm rest 12 so that the arm pivot 58 is rotated by the rotation of the arm rest 12. In some embodiments, two arm pivots 58 are located on each side of the coupling projection 22. However, one of ordinary skill in the relevant art will understand that any suitable number and arrangement of arm pivots 58 may be used in conjunction with the up-stop mechanism 18 and the down-stop mechanism 20.

The arm pivot 58 may include a generally circular central portion 60 with the aperture 24 generally proximate a center of the central portion 60, a first projection 62 extending from the central portion 60 in a forward direction when the arm rest 12 is in a deployed position, and a second projection 64 extending downwardly from the central portion 60 when the arm rest 12 is in a deployed position. However, other locations and arrangements of the projections 62, 64 may be included as needed or desired. One of ordinary skill in the relevant art will understand that the arm pivot 58 may have any suitable shape including but not limited to clover-leaf, triangular, clubbed, round, rectilinear, elliptical, pentagonal, hexagonal, or any other polygonal shape as needed.

The stop pin 34 may be located on the first projection 62 in a position that is configured to contact the stop surface 36 when the arm rest 12 reaches the raised position to prevent further rotation of the arm rest 12 in the raised direction so that the up-stop mechanism 18 may otherwise operate as described above with respect to the pivot plate 16.

With respect to the second projection 64, a contact plate 66 may be mounted to the arm pivot 58 in a location that allows the contact plate 66 to contact the adjustment pin 38 when the arm rest 12 is in a deployed position. The contact plate 66 may be formed of materials including but not limited to steel, other metallic materials, other composite materials, or other similar high strength materials designed to withstand higher loads. Other than altering the arm pivot 58 so that the contact plate 66, rather than the arm pivot 58, contacts the adjustment pin 38 when the arm rest 12 is in a deployed position, the down-stop mechanism 20 may otherwise operate as described above with respect to the pivot plate 16.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arm rest stop assembly comprising:
   (a) an arm rest pivotally coupled to a fixed portion of a passenger seat;
   (b) a pivot plate fixedly coupled to the arm rest and pivotally coupled to the fixed portion of the passenger seat;
   (c) a down-stop mechanism comprising:
      (i) an adjustment pin inserted through an aperture in the fixed portion of the passenger seat in a location that is covered by the arm rest and where the adjustment pin contacts the pivot plate when the arm rest reaches a deployed position; and
      (ii) an adjustment fastener inserted through a slot in the fixed portion of the passenger seat, wherein the slot intersects the aperture that receives the adjustment pin in the fixed portion of the passenger seat, and wherein the adjustment fastener is fixed to each of the adjustment pin and the fixed portion of the passenger seat, wherein application of a torque force to the adjustment fastener induces linear travel of the adjustment pin relative to the fixed portion of the passenger seat.

2. The arm rest stop assembly of claim 1, further comprising an up-stop mechanism comprising a stop pin coupled to the pivot plate, wherein the location of the stop pin is configured to contact a surface of the fixed portion of the passenger seat when the arm rest reaches a raised position.

3. The arm rest stop assembly of claim 1, wherein the adjustment pin is configured to halt rotation of the arm rest from a raised position to a deployed position.

4. The arm rest stop assembly of claim 3, wherein the adjustment pin comprises a rounded contact surface to prevent application of a twisting force about a longitudinal axis of the adjustment pin when the arm rest rotation is halted by the adjustment pin.

5. The arm rest stop assembly of claim 3, wherein the location of the adjustment pin does not present a pinch point for passengers when the arm rest is lowered to the deployed position.

6. The arm rest stop assembly of claim 1, wherein a lengthwise aspect of the slot is oriented at more than 45 degrees relative to a horizontal plane.

7. The arm rest stop assembly of claim 1, wherein a securing device is positioned within the slot to prevent loosening of the adjustment fastener.

8. An arm rest stop assembly comprising:
   (a) an arm rest pivotally coupled to a fixed portion of a passenger seat;
   (b) a pivot plate fixedly coupled to the arm rest and pivotally coupled to the fixed portion of the passenger seat;
   (c) an up-stop mechanism comprising a stop pin coupled to the pivot plate, wherein a location of the stop pin is configured to contact a surface of the fixed portion of the passenger seat when the arm rest reaches a raised position; and
   (d) a down-stop mechanism comprising:
      an adjustment pin inserted through an aperture in the fixed portion of the passenger seat in a location where the adjustment pin contacts the pivot plate when the arm rest reaches a deployed position and does not present a pinch point for passengers when the arm rest is lowered to the deployed position: and
      an adjustment fastener inserted through a slot in the fixed portion of the passenger seat, wherein the slot intersects the aperture that receives the adjustment pin in the fixed portion of the passenger seat, and wherein the adjustment fastener is fixed to each of the adjustment pin and the fixed portion of the passenger seat.

9. The arm rest stop assembly of claim 8, wherein the adjustment pin comprises a rounded contact surface to prevent application of a twisting force about a longitudinal axis of the adjustment pin when the adjustment pin contacts the pivot plate.

10. The arm rest stop assembly of claim 8, wherein a lengthwise aspect of the slot is oriented at more than 45 degrees relative to a horizontal plane.

11. The arm rest stop assembly of claim 8, wherein a securing device is positioned within the slot to prevent loosening of the adjustment fastener.

12. An arm rest stop assembly comprising:
   (a) a spreader comprising an aperture configured to receive an adjustment pin and a slot configured to receive an adjustment fastener;
   (b) an arm rest pivotally coupled to the spreader for rotation about an arm rest axis of rotation and having a stopping element fixedly supported on the arm rest; and
   (c) a down-stop mechanism comprising:
      (i) the adjustment pin inserted through the aperture in the spreader, wherein the adjustment pin is configured to halt rotation of the arm rest from a raised position to a deployed position; and
      (ii) the adjustment fastener inserted through the slot in the spreader, wherein the slot intersects the aperture in the spreader, and wherein the adjustment fastener is fixed to each of the adjustment pin and the spreader,
   wherein the adjustment in comprises a round cross sectioned cylinder having a contact surface engaged by the stopping element on a radial line through a longitudinal axis of the cylinder to prevent application of a twisting force about the longitudinal axis of the adjustment pin when the arm rest rotation is halted by the adjustment pin.

13. The arm rest stop assembly of claim 12, wherein a lengthwise aspect of the slot is oriented at more than 45 degrees relative to a horizontal plane.

14. The arm rest stop assembly of claim 12, wherein a securing device is positioned within the slot to prevent loosening of the adjustment fastener.

15. The arm rest stop assembly of claim 12, wherein the adjustment pin is positioned on the spreader in a location that does not present a pinch point for passengers when the arm rest is lowered to the deployed position.

16. The arm rest stop assembly of claim 12, wherein application of a torque force to the adjustment fastener induces linear travel of the adjustment pin relative to the fixed portion of a passenger seat.

\* \* \* \* \*